United States Patent
Cui et al.

(10) Patent No.: US 12,317,202 B2
(45) Date of Patent: May 27, 2025

(54) SYNCHRONIZATION SIGNAL BLOCK RECEPTION IN WIRELESS COMMUNICATIONS

(71) Applicant: Apple Inc., Cupertino, CA (US)

(72) Inventors: Jie Cui, San Jose, CA (US); Yang Tang, San Jose, CA (US); Wenshu Zhang, San Diego, CA (US); Qiming Li, Beijing (CN); Dawei Zhang, Saratoga, CA (US); Hong He, San Jose, CA (US); Xiang Chen, Campbell, CA (US); Chunhai Yao, Beijing (CN); Chunxuan Ye, San Diego, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 904 days.

(21) Appl. No.: 17/593,744

(22) PCT Filed: Oct. 23, 2020

(86) PCT No.: PCT/CN2020/123200
§ 371 (c)(1),
(2) Date: Sep. 23, 2021

(87) PCT Pub. No.: WO2022/082717
PCT Pub. Date: Apr. 28, 2022

(65) Prior Publication Data
US 2022/0312351 A1    Sep. 29, 2022

(51) Int. Cl.
*H04W 56/00* (2009.01)
*H04W 16/28* (2009.01)
*H04W 24/08* (2009.01)

(52) U.S. Cl.
CPC ......... *H04W 56/001* (2013.01); *H04W 16/28* (2013.01); *H04W 24/08* (2013.01); *H04W 56/0045* (2013.01)

(58) Field of Classification Search
CPC ... H04W 56/001; H04W 16/28; H04W 24/08; H04W 56/0045
(Continued)

(56) References Cited

U.S. PATENT DOCUMENTS

2019/0052379 A1    2/2019  Lin et al.
2020/0029238 A1    1/2020  Si et al.
(Continued)

FOREIGN PATENT DOCUMENTS

CN    110945942    3/2020
CN    111262674    6/2020
(Continued)

OTHER PUBLICATIONS

Fujitsu, "RA procedure considering SSBs with QCL relationship"; 3GPP TSG-RAN WG2 Meeting #109 electronic; R2-2000771; Feb. 14, 2020; 3 sheets.

*Primary Examiner* — Chi Tang P Cheng
(74) *Attorney, Agent, or Firm* — Fay Kaplun & Marcin, LLP

(57) ABSTRACT

A user equipment (UE) is configured to monitor synchronization signal blocks (SSB) transmitted by a base station of a network. The UE receives a configuration comprising a first indication of a quasi-co-location (QCL) relationship between synchronization signal block (SSB) positions and a second indication of a location of one or more sets of target SSBs, wherein SSBs in each of one or more sets of target SSBs are quasi-co-located, determines a number of SSB occasions corresponding to each set of the one or more sets of target SSBs to be transmitted by the base station and determines a monitoring scheme for the one or more sets of target SSBs based on, at least, the configuration and the number of SSB occasions corresponding to each set of target SSBs.

18 Claims, 4 Drawing Sheets

(58) Field of Classification Search
USPC .......................................................... 370/503
See application file for complete search history.

(56) References Cited

U.S. PATENT DOCUMENTS

2020/0413356 A1* 12/2020 Wang ................... H04W 72/046
2021/0045076 A1*  2/2021 Tomeba ............... H04W 56/001

FOREIGN PATENT DOCUMENTS

| EP | 3952489 | 2/2022 |
| WO | 2020/030675 | 2/2020 |

* cited by examiner

SYNCHRONIZATION SIGNAL BLOCK RECEPTION IN WIRELESS COMMUNICATIONS

BACKGROUND

A user equipment (UE) may scan one or more frequency bands and monitor for synchronization information broadcast by a cell of the network. For example, the cell may transmit multiple synchronization signal blocks (SSBs) within a particular time window or burst. Once detected, the UE may acquire time and frequency synchronization with the cell using the synchronization information.

In some networks, signaling between the UE and a cell of the network may be performed over the unlicensed spectrum. The unlicensed spectrum is shared by different devices using different communication protocols. Access to the unlicensed spectrum may implicate various regulations and/or standards. For instance, Listen-Before-Talk (LBT) may be implemented in accordance with these regulations and/or standards to access the unlicensed spectrum for communications.

SUMMARY

Some exemplary embodiments are related to a user equipment (UE) having a transceiver configured to communicate with a base station and a processor communicatively coupled to the transceiver and configured to perform operations. The operations include receiving a configuration comprising a first indication of a quasi-co-location (QCL) relationship between synchronization signal block (SSB) positions and a second indication of a location of one or more sets of target SSBs, wherein SSBs in each of one or more sets of target SSBs are quasi-co-located, determining a number of SSB occasions corresponding to each set of the one or more sets of target SSBs to be transmitted by the base station and determining a monitoring scheme for the one or more sets of target SSBs based on, at least, the configuration and the number of SSB occasions corresponding to each set of target SSBs.

Other exemplary embodiments are related to a processor of a user equipment (UE) configured to perform operations. The operations include receiving a configuration comprising a first indication of a quasi-co-location (QCL) relationship between synchronization signal block (SSB) positions and a second indication of a location of one or more sets of target SSBs, wherein SSBs in each of one or more sets of target SSBs are quasi-co-located, determining a number of SSB occasions corresponding to each set of the one or more sets of target SSBs to be transmitted by a base station and determining a monitoring scheme for the one or more sets of target SSBs based on, at least, the configuration and the number of SSB occasions corresponding to each set of target SSBs.

Still further exemplary embodiments are related to a base station having a transceiver configured to communicate with a user equipment (UE) and a processor communicatively coupled to the transceiver and configured to perform operations. The operations include configuring one of a synchronization signal block (SSB) burst or a SSB based radio resource management (RRM) measurement timing configuration (SMTC) window comprising a first indication of a quasi-co-location (QCL) relationship between synchronization signal block (SSB) positions and a second indication of a location of one or more sets of target SSBs, wherein SSBs in each of one or more sets of target SSBs are quasi-co-located and transmitting, to the UE, the one of the SSB burst or the SMTC window.

DETAILED DESCRIPTION

Figure 1:
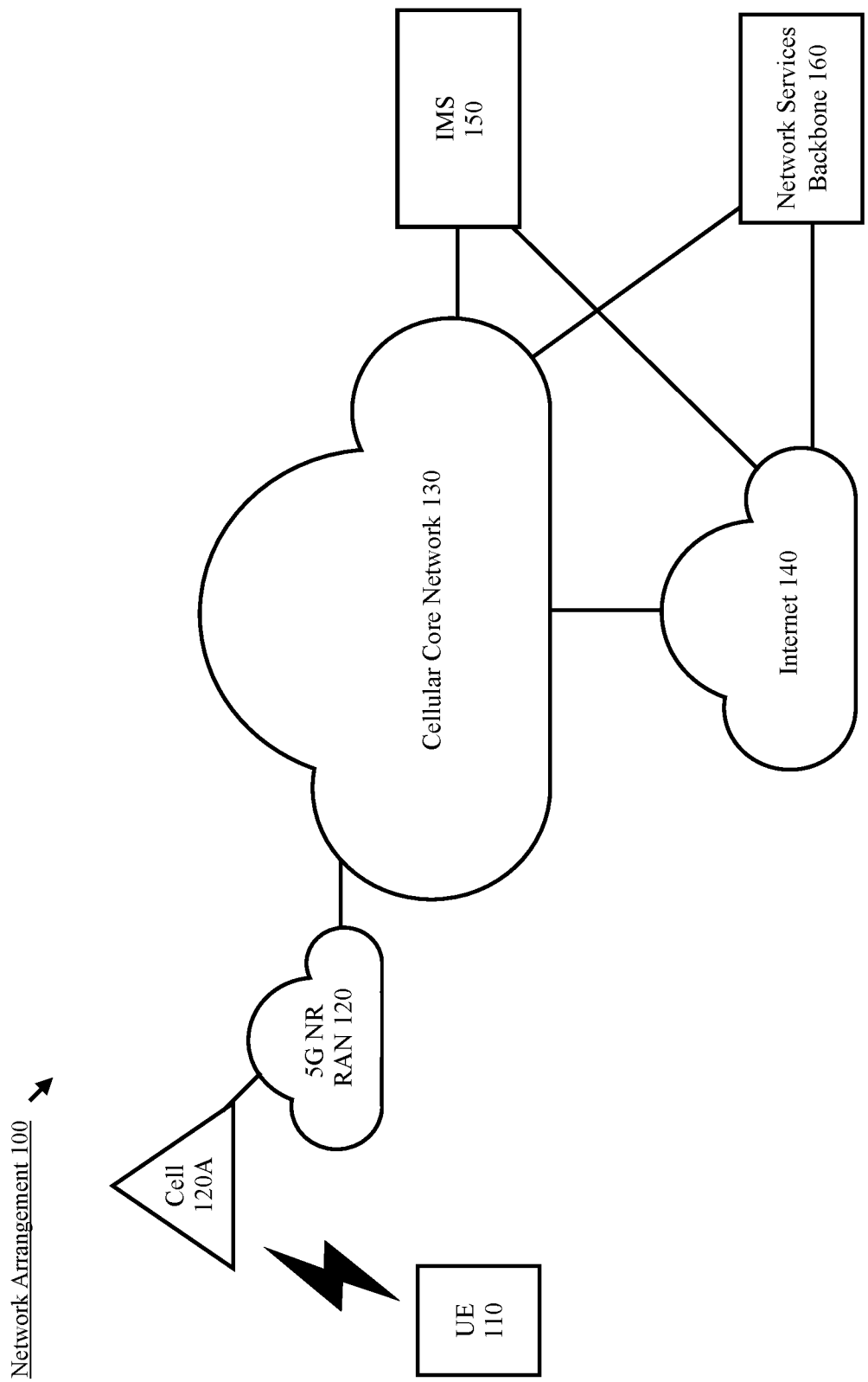
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe devices, systems and methods for implementing various exemplary techniques related to a user equipment (UE) monitoring synchronization signal blocks (SSBs) transmitted by a cell of a network.

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to the UE communicating with a 5G New Radio (NR) network that is capable of operating in the unlicensed spectrum, e.g., 5G NR-U. However, reference to a 5G NR network is merely provided for illustrative purposes. The exemplary embodiments may apply to any type of network operating in the unlicensed spectrum.

The unlicensed spectrum is a shared transmission medium that may be used by a plurality of different devices utilizing a plurality of different communication protocols. Access to the unlicensed spectrum may implicate various regulations and/or standards. For instance, Listen-Before-Talk (LBT) may be implemented in accordance with these regulations and/or standards to access the unlicensed spectrum for communications. LBT may relate to determining whether channels in the unlicensed spectrum are occupied by other signals prior to performing a transmission over the unlicensed spectrum.

Those skilled in the art will understand that SSBs may be monitored for any of a variety of reasons including for radio resource management (RRM). Examples of RRM operations that may use SSBs are provided below. The exemplary embodiments may be used to monitor the SSBs for any purpose including the RRM operations described below or any other purpose. For example, the RRM operations for which the SSBs may be monitored may include, radio link monitoring (RLM), beam failure detection (BFD), candidate beam detection (CBD), Layer 1 Received Signal Reference Power (L1-RSRP) measurements, Layer 3 (L3) cell measurements, Transmission Configuration Indicator (TCI) state switching, Secondary Cell (SCell) activation, Primary SCell (PSCell) addition/release, handover, Radio Resource Control (RRC) re-establishment, RRC release, L3 cell detection, etc.

It should also be understood that the term "monitoring" SSBs may encompass any operation related to the SSBs, including, but not limited to, evaluation, detection, identification, activation, etc.

FIG. 1 shows a network arrangement 100 according to various exemplary embodiments. The network arrangement 100 includes the UE 110. Those skilled in the art will understand that the UE 110 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. An actual network arrangement may include any number of UEs being used by any number of users. Thus, the example of a single UE 110 is only provided for illustrative purposes.

The UE 110 may be configured to communicate directly with one or more networks. In the example of the network arrangement 100, the UE 110 may wirelessly communicate with a 5G new radio (NR) radio access network (5G NR RAN) 120. The 5G NR RAN 120 may be configured to operate in the unlicensed spectrum. The UE 110 may also communicate with other types of networks (e.g., 5G cloud RAN, a next generation RAN (NG-RAN), an LTE RAN, a legacy RAN, WLAN, etc.). The UE 110 may also communicate with networks over a wired connection. Therefore, the UE 110 may include a 5G NR chipset to communicate with the 5G NR RAN 120 and other chipsets to communicate with other types of networks, e.g., an ISM chipset to communicate with a WLAN.

The 5G NR RAN 120 may be a portion of a cellular network that may be deployed by a network carrier (e.g., Verizon, AT&T, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 122 may include any type of wireless local area network (WiFi, Hot Spot, IEEE 802.11x networks, etc.).

The UE 110 may connect to the 5G NR RAN 120 via a cell 120A. Those skilled in the art will understand that any association procedure may be performed for the UE 110 to connect to the 5G NR RAN 120. For example, as discussed above, the 5G NR RAN 120 may be associated with a particular network carrier where the UE 110 and/or the user thereof has a contract and credential information (e.g., stored on a SIM card). Upon detecting the presence of the 5G NR RAN 120, the UE 110 may transmit the corresponding credential information to associate with the 5G NR RAN 120. More specifically, the UE 110 may associate with a specific cell (e.g., the cell 120A of the 5G NR RAN 120). As mentioned above, the use of the 5G NR RAN 120 is for illustrative purposes and any type of network may be used. For example, the UE 110 may also connect to the LTE-RAN (not pictured) or the legacy RAN (not pictured).

The cell 120A may be equipped with one or more communication interfaces. For example, the cell 120A may be equipped with a communication interface that is configured to communicate with UEs over the unlicensed spectrum. Further, the cell 120A may be configured with various processing components that are configured to perform various operations such as, but not limited to, receiving signals from UEs and other network components, processing received signals and generating signals for transmission. For example, the cell 120A may be equipped with one or more processors. The processors may include one or more baseband processors and/or one or more applications processors. These processors may be configured to execute software and/or firmware. In another example, the cell may be equipped with an integrated circuit with or without firmware. For example, the integrated circuit may include input circuitry to receive signals, processing circuitry to process the signals and other information and output circuitry to output generated signals and information to other components (e.g., a communication interface, a transceiver, etc.). The functionality described herein for the cell 120A may be implemented in any of these or other configurations known in the art for a cell of a network.

In addition to the networks 120 and 122 the network arrangement 100 also includes a cellular core network 130. The cellular core network 130 may be considered to be the interconnected set of components that manages the operation and traffic of the cellular network. The network arrangement 100 also includes the Internet 140, an IP Multimedia Subsystem (IMS) 150, and a network services backbone 160. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
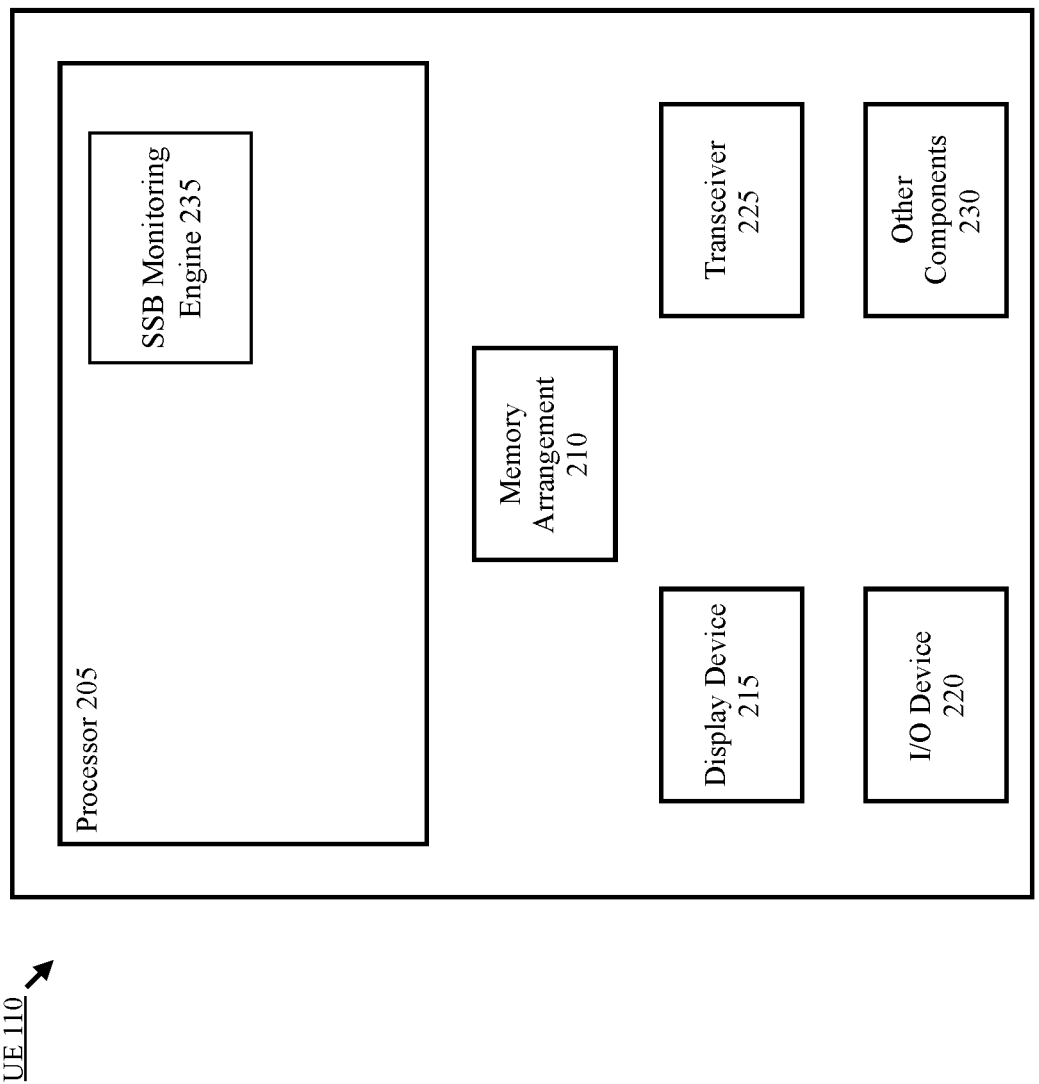
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include an SSB monitoring engine 235. The SSB monitoring engine 235 may perform various operations related to monitoring SSBs that are transmitted by cells of the network. (e.g., gNB 120A of 5G NR RAN 120).

The above referenced engine each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engine may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120 and the WLAN 122. Accordingly, the transceiver 225 may operate on a variety of different frequencies or channels (e.g., set of consecutive frequencies).

A cell (e.g., cell 120A) may transmit multiple target SSBs for the purposes of radio resource management (RRM). Examples of different RRM operations were described above. Each target SSB may include contents such as, but not limited to, a physical cell ID (PCI), at least one primary synchronization signal (PSS), at least one secondary synchronization signal (SSS), at least one physical broadcast channel (PBCH) demodulation reference signal (DM-RS) and PBCH data. The UE 110 may monitor for the one or more of the target SSBs. However, as described above, when operating in the unlicensed spectrum, the cell 120A may have to perform carrier sensing operations such as LBT. If the channel is busy, the cell 120A may not transmit one or more of the multiple target SSBs.

Figure 3:
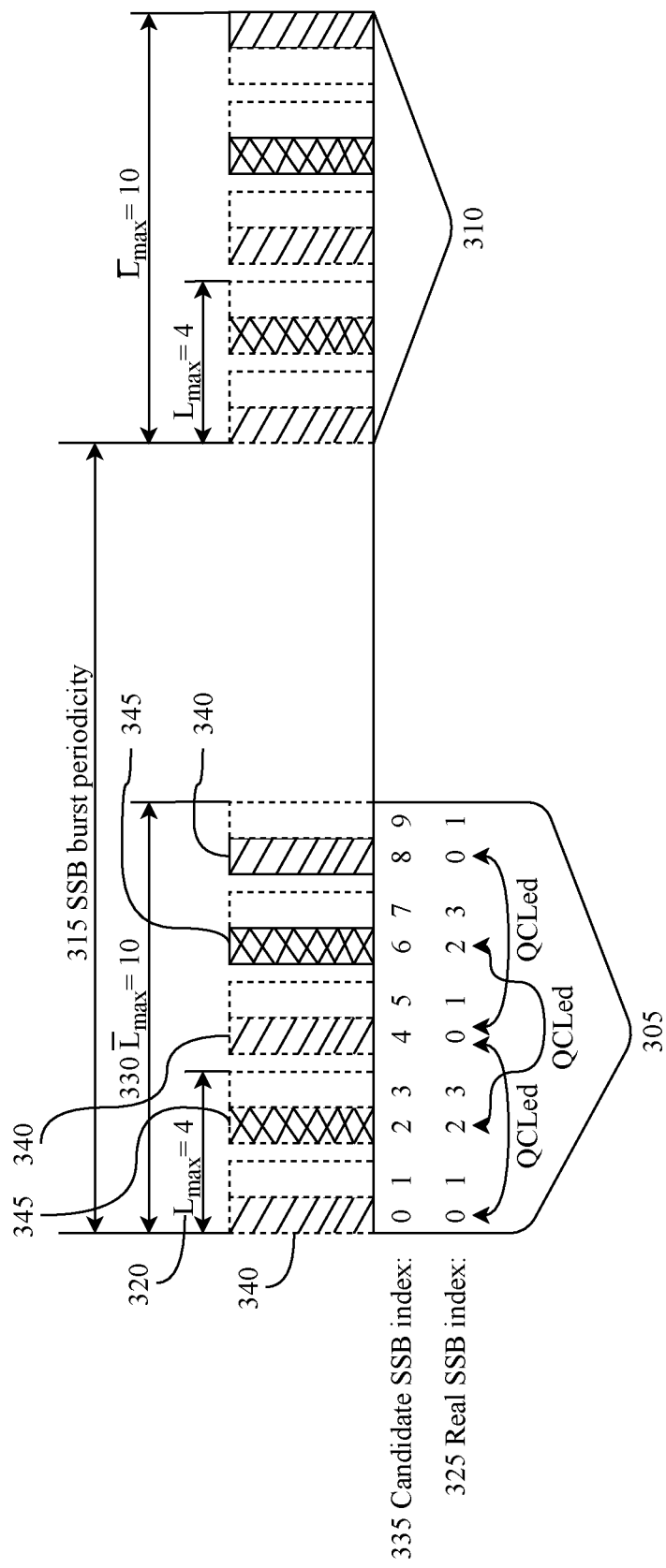
FIG. 3 shows a timeline illustrating an exemplary SSB burst according to various exemplary embodiments.

FIG. 3 shows a timeline 300 illustrating an exemplary SSB burst according to various exemplary embodiments. In FIG. 3, it may be considered that two SSB bursts 305, 310 are illustrated. The SSB bursts 305, 310 have a SSB burst periodicity 315. In 5G NR, the cell 120A may transmit up to $L_{MAX}$ 320 target SSBs in a half frame, where $L_{MAX}$ 320 is dependent on the frequency range. In NR-U, the upper bound number of transmitted SSBs is limited by min{SSB-PositionQCL-Relation-r16, LMAX 320}. Thus, in the example of FIG. 3, $L_{MAX}$ 320=4, meaning that (e.g., min{SSB-PositionQCL-Relation-r16, $L_{MAX}$ 320}=4) target SSBs may be transmitted. Referring below the SSB burst 305, the Real SSB Index 325 refers to an index of the actual maximum number of target SSBs in ascending order in time from 0 to $L_{MAX}$-1 (0-3 in this example).

However, as described above, since the target SSBs are being transmitted in the unlicensed spectrum, there may be situations where the channel on which the cell 120A intends to transmit the target SSBs is busy with other transmissions. In such cases, the cell 120A cannot transmit the target SSBs using the intended time/frequency resources. Thus, a further parameter $\overline{L}_{MAX}$ 330 may be defined as a maximum number of SSB occasions or candidates that may occur during the burst. In the example of FIG. 3, $\overline{L}_{MAX}$ 330=10, meaning that up to 4 target SSBs (e.g., min{SSB-PositionQCL-Relation-r16, $L_{MAX}$ 320}=4) may be transmitted in the 10 SSB occasions or candidates. Again, referring below the SSB burst 305, the Candidate SSB Index 335 refers to an index of the maximum number of SSB occasions in ascending order in time from 0 to $\overline{L}_{MAX}$ 1 (0-9 in this example).

Continuing with the example of FIG. 3, while $L_{MAX}$ 320=4, there are only two actual target SSBs that are being transmitted by the cell 120A in the bursts 305 and 310. These target SSBs are shown as the cross-hatched target SSB 340 at Candidate SSB Index 0 and target SSB 345 at Candidate SSB Index 2. The Candidate SSB Indices 1 and 3 may be considered non-configured SSB transmission occasions. Thus, in this example, the UE 110 may receive SSB configuration information including a bitmap indicating the positions of the target SSBs 340 and 345 in the burst (e.g., ssb-PositionsInBurst=1010).

In the example of FIG. 3, it may be considered that the cell 120A could not actually transmit the target SSB 440 at Candidate SSB Index 0 and SSB 345 at Candidate SSB Index 2 because the LBT failed (e.g., the channel was being used for other communications). However, because there are other SSB occasions (e.g., Candidate SSB Indices 4-9), the cell 120A may transmit the target SSBs 340 and 345 in one or more of these SSB occasions. To select the SSB occasions in which the SSBs may be transmitted, a further parameter may be defined. The parameter may allow the UE 110 to determine the quasi-colocation (QCL) assumptions for monitoring the SSBs. According to the 3GPP standards, two antenna ports are said to be QCL if properties of the channel over which a symbol on one antenna port is conveyed can be inferred from the channel over which a symbol on the other antenna port is conveyed. For example, the radio channel properties that may be common across the antenna ports may include a Doppler spread and/or shift, average delay, delay spread, average gain, spatial receiver parameters, etc. The QCL parameter may be referred to as a Q value (e.g., SSB-PositionQCL-Relation-r16 information element (IE)). In some embodiments, a set of Q values may be defined in standards (e.g., 3GPP standards) depending on the frequency range, may be provided to the UE 110 in a system information block (SIB) from the cell 120A, etc.

In the example of FIG. 3, it may be considered that Q=n4. Thus, an SSB may be repeated every 4 SSB transmission occasions. In this example, this means that the target SSB 340 having a Real SSB Index of 0, may be transmitted as a set of SSBs in SSB occasions having Candidate SSB Indices of 0, 4 and 8. The target SSB 345 having a Real SSB Index of 2, may be transmitted as a set of SSBs in SSB occasions having Candidate SSB Indices of 2 and 6. Thus, in this example, the target SSB 340 may be transmitted in three (3) SSB occasions, whereas the target SSB 345 may only be transmitted in two (2) SSB occasions.

However, the 3GPP standards have defined that a UE is required to monitor the first two SSB occasions for each target SSB. Thus, in the example of FIG. 3, the UE 110 would monitor the SSB occasions having Candidate SSB Indices of 0 and 4 for the set of target SSBs 340 even though the target SSB 340 could be transmitted in the SSB occasion having Candidate Index 8. The UE 110 would monitor the SSB occasions having Candidate SSB Indices of 2 and 6 for the set of target SSBs 345.

Figure 4:
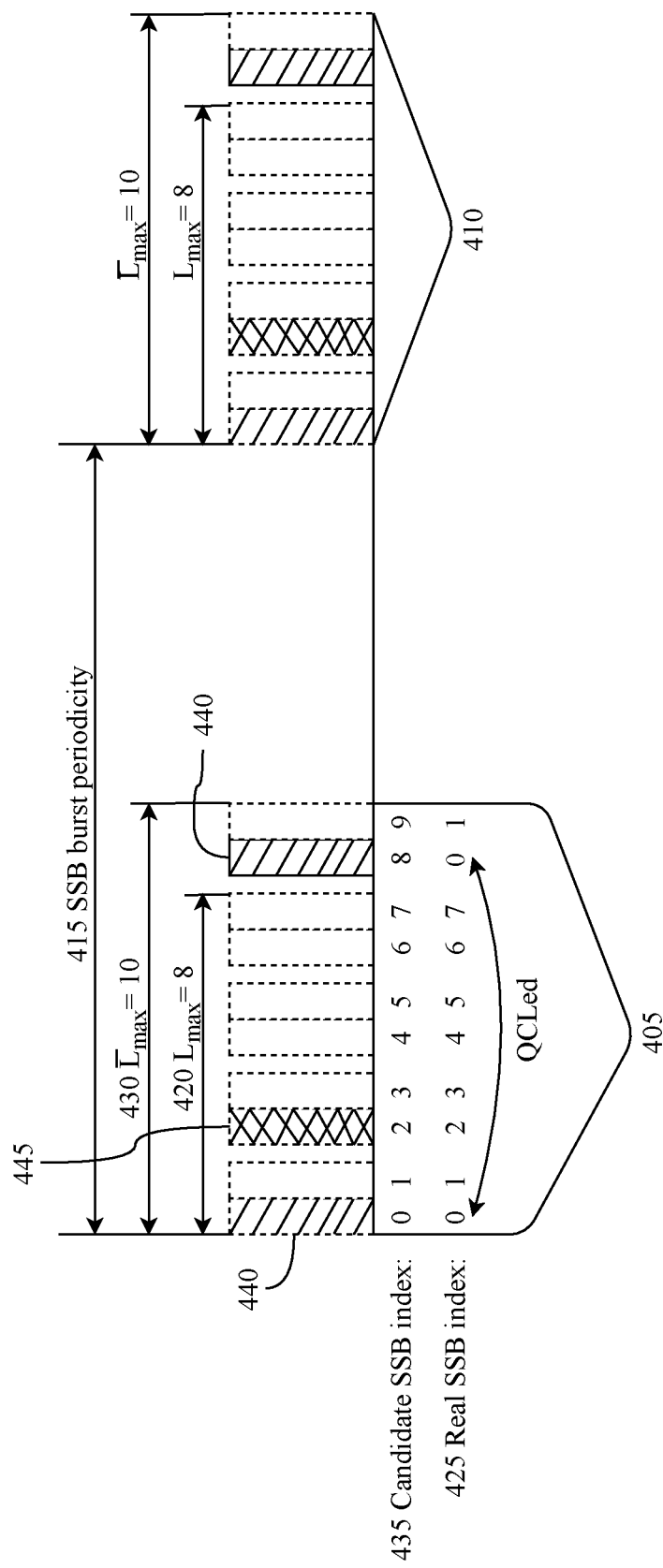
FIG. 4 shows a timeline illustrating another exemplary SSB burst according to various exemplary embodiments.

FIG. 4 shows a timeline 400 illustrating another exemplary SSB burst according to various exemplary embodiments. The SSB burst of FIG. 4 is generally the same as the SSB burst in FIG. 3. There are two SSB bursts 405 and 410 having an SSB burst periodicity 415. One difference is that the $L_{MAX}$ 420=8 (e.g., min{SSB-PositionQCL-Relation-r16, $L_{MAX}$ 420}=8) and the Real SSB Index 425 is numbered 0-7. The $\overline{L}_{MAX}$ 430=10 and the Candidate SSB Index 435 is numbered from 0-9 in this example.

Again, there are only two actual target SSBs, target SSB 440 at Candidate SSB Index 0 and target SSB 445 at Candidate SSB Index 2. In the example of FIG. 4, it may be considered that Q=n8. Thus, an SSB may be repeated every 8 SSB transmission occasions. In this example, this means that the target SSB 440 having a Real SSB Index of 0, may be transmitted as a set of SSBs in SSB occasions having Candidate SSB Indices of 0 and 8. The target SSB 445 having a Real SSB Index of 2, may be transmitted in the SSB occasion having the Candidate SSB Index 2. Thus, in this example, the set of target SSBs 440 may be transmitted in two (2) SSB occasions, whereas the target SSB 445 may only be transmitted in one (1) SSB occasion.

As described above, the 3GPP standards have defined that a UE is required to monitor the first two SSB occasions for each target SSB. Thus, in the example of FIG. 4, the UE 110 would monitor the SSB occasions having Candidate SSB Indices of 0 and 8 for the set of target SSBs 440. However, there is only one (1) SSB occasion (e.g., Candidate SSB Index 2) associated with the target SSB 445. Thus, the UE 110 may violate the standard by not monitoring a second SSB occasion for the target SSB 445.

In some exemplary embodiments, the UE 110 may be configured to monitor only a single SSB occasion for a particular target SSB in an SSB burst when there is only one SSB occasion defined for that target SSB. Referring to the example of FIG. 4, the UE 110 may be configured to monitor only the one (1) SSB occasion (e.g., Candidate SSB Index 2) associated with the target SSB 445.

In other exemplary embodiments, the UE 110 may be configured with an equation that defines the number of SSB occasions that the UE 110 should monitor during an SSB burst. The equation may be as follows:

$$\left[\frac{\text{candidate } SSB \text{ index}}{SSB - \text{Position} QCL-\text{Relation} - r16}\right] = X$$

It should be understood that the numerator of the above equation refers to a highest Candidate SSB Index for the set of target SSBs and the denominator refers to the Q value. When X≥1, the UE 110 may monitor the first two (2) successive SSB occasions for the target SSB in one SSB burst. When X<1, the UE may monitor one (1) SSB occasion for the target SSB in one SSB burst.

To provide an example, the parameters associated with the SSB 440 and 445 of FIG. 4 may be evaluated using the above equation. For SSB 440, the highest Candidate SSB Index=8 and the Q value=8. Thus, 8/8=1, meaning that X≥1 and the UE 110 should monitor the first two successive SSB occasions associated with the target SSB 440, e.g., Candidate SSB Indices of 0 and 8. For the target SSB 445, the highest Candidate SSB Index=2 and the Q value=8. Thus, 2/8 is less than 1, meaning that the UE 110 should monitor only the first SSB occasion associated with the target SSB 445, e.g., Candidate Index of 2.

In still further exemplary embodiments, the monitoring of the SSBs by the UE 110 may be based on a percentage (Y) of target SSBs which has only one single candidate SSB position in the SSB burst. The percentage (Y) is determined as a number of target SSBs which has only one single candidate SSB position compared to the total number of target SSBs in the SSB burst. The percentage (Y) may then be compared to a threshold percentage (Z). If the percentage (Y) is greater than the threshold percentage (Z), the UE 110 will cancel the measurement or evaluation of all target SSBs in the SSB burst.

Again, to provide an example using the parameters of FIG. 4. In the example of FIG. 4, there are 2 target SSBs 440 and 445 and one of those target SSBs 445 has only a single candidate SSB occasion. Thus, the percentage (Y) for the example of FIG. 4 is 50%. If it were considered that the threshold percentage (Z) was set at 0%, this means that the UE 110 will not monitor any of the target SSBs in the SSB bursts 405 and 410 because Y=50% is greater than the threshold percentage of Z=0%. On the other hand, if the threshold percentage (Z) was set at 60%, this means the UE 110 will monitor the target SSBs in the bursts 405 and 410 (e.g., candidate indices 0 and 8 will be monitored for target SSB 440 and candidate index 2 will be monitored for SSB 445) because Y=50% is less than the threshold percentage of Z=60%.

To provide another example, the example of FIG. 3 may be used. In this example, there are 2 target SSBs 340 and 345 and none of those target SSBs have only a single candidate SSB occasion. Thus, the percentage (Y) for the example of FIG. 3 is 0%. Thus, it does not matter what the threshold percentage (Z) value is set at because all the target SSBs have at least two (2) associated SSB monitoring occasions. Thus, the UE 110 will monitor the first two successive SSB occasions for each of the target SSBs 340 and 345.

The above examples were directed to the UE 110 operation with respect to SSB monitoring. However, the network (e.g., the cell 120A) may also be configured to transmit target SSBs in such a way that there will be expected UE behavior.

In some exemplary embodiments, the network (e.g., cell 120A) may configure or guarantee that there are at least two SSB candidate positions QCLed or associated with a target SSB, e.g., the network configures the target SSBs similar to the example of FIG. 3 where it is guaranteed that each target SSB has at least two (2) associated SSB occasions. In some embodiments, if network cannot configure the target SSBs in this manner, the network may assume that the UE 110 monitors only one SSB occasion for the target SSB that is not configured with at least two (2) SSB occasions.

In some exemplary embodiments, the network (e.g., cell 120A) may configure or guarantee that there is at least one target SSB that satisfies the scenario where X≥1 according to the equation described above. For those target SSBs where X<1, the network may assume that the UE 110 monitors only one SSB occasion for the target SSBs.

In still further exemplary embodiments, the network (e.g., cell 120A) may configure or guarantee that the percentage of target SSBs with at least two SSB candidate positions in the SSB burst will be equal to or greater than the threshold percentage (Z) described above. For example, once the percentage threshold (Z) is set, the network may then configure the SSB burst to satisfy the threshold (e.g., percentage of target SSBs with at least two SSB candidate positions compared to the total number of target SSBs is greater than the percentage threshold) thereby allowing the UE 110 to monitor the SSB burst, rather than skipping the SSB burst for all target SSBs when the percentage of target SSBs having less than two (2) SSB occasions compared to the total number of target SSBs is greater than the percentage threshold.

It should be understood that the SSB bursts described with respect to FIGS. 3 and 4 above are only examples. The exemplary embodiments may be applied to SSB bursts that are configured in a different manner, e.g., having one or more different values for the parameters $L_{MAX}$, $\bar{L}_{MAX}$, Q, etc. In addition, while the exemplary embodiments have been described with reference to SSB bursts, the exemplary embodiments may also be applied to SS block based RRM measurement timing configuration (SMTC) windows.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A user equipment (UE), comprising:
    a transceiver configured to communicate with a base station; and
    a processor communicatively coupled to the transceiver and configured to perform operations comprising:
        receiving a configuration comprising a first indication of a quasi-co-location (QCL) relationship between synchronization signal block (SSB) positions and a second indication of a location of one or more sets of target SSBs, wherein SSBs in each of the one or more sets of target SSBs are quasi-co-located;
        determining a number of SSB occasions corresponding to each set of the one or more sets of target SSBs to be transmitted by the base station; and
        determining a monitoring scheme for the one or more sets of target SSBs based on, at least, the configuration and the number of SSB occasions corresponding to each set of target SSBs, wherein the monitoring scheme comprises monitoring two successive SSB occasions for a first set of target SSBs having two or more corresponding SSB occasions and monitoring one SSB occasion for a second set of target SSBs having less than two corresponding SSB occasions.

2. The UE of claim 1, wherein the one or more sets of target SSBs are transmitted in one of an SSB burst or a SSB based RRM measurement timing configuration (SMTC) window.

3. The UE of claim 1, wherein the operations further comprise:
    determining a value by dividing a highest candidate SSB index for a set of target SSBs by a value corresponding to the first indication,
    wherein, when the value is greater than or equal to 1, the monitoring scheme comprises monitoring two successive SSB occasions for the set of target SSBs, and
    wherein, when the value is less than 1, the monitoring scheme comprises monitoring one SSB occasion for the set of target SSBs.

4. The UE of claim 1, wherein the operations further comprise:
    determining a percentage value based on a number of sets of target SSBs having less than two corresponding SSB occasions compared to a total number of sets of target SSBs; and
    comparing the percentage value to a threshold percentage.

5. The UE of claim 4, wherein, when the percentage value is greater than the threshold percentage, the monitoring scheme comprises skipping the monitoring of the one or more sets of target SSBs.

6. The UE of claim 4, wherein, when the percentage value is less than the threshold percentage, the monitoring scheme comprises monitoring two successive SSB occasions for a first set of target SSBs having two or more corresponding SSB occasions and monitoring one SSB occasion for a second set of target SSBs having less than two corresponding SSB occasions.

7. The UE of claim 1, wherein the UE monitors the one or more sets of target SSBs for performing radio resource management (RRM) operations comprising one of radio link monitoring (RLM), beam failure detection (BFD), candidate beam detection (CBD), Layer 1 Received Signal Reference Power (L1-RSRP) measurements, Layer 3 (L3) cell measurements, Transmission Configuration Indicator (TCI) state switching, Secondary Cell (SCell) activation, Primary SCell (PSCell) addition or release, handover, Radio Resource Control (RRC) re-establishment, RRC release, or L3 cell detection.

8. The UE of claim 1, wherein the one or more sets of target SSBs are transmitted by the base station in a new radio unlicensed (NR-U) band.

9. A processor of a user equipment (UE) configured to perform operations comprising:
    receiving a configuration comprising a first indication of a quasi-co-location (QCL) relationship between synchronization signal block (SSB) positions and a second indication of a location of one or more sets of target SSBs, wherein SSBs in each of the one or more sets of target SSBs are quasi-co-located;
    determining a number of SSB occasions corresponding to each set of the one or more sets of target SSBs to be transmitted by a base station; and
    determining a monitoring scheme for the one or more sets of target SSBs based on, at least, the configuration and the number of SSB occasions corresponding to each set of target SSBs, wherein the monitoring scheme comprises monitoring two successive SSB occasions for a first set of target SSBs having two or more corresponding SSB occasions and monitoring one SSB occasion for a second set of target SSBs having less than two corresponding SSB occasions.

10. The processor of claim 9, wherein the one or more sets of target SSBs are transmitted in one of an SSB burst or a SSB based RRM measurement timing configuration (SMTC) window.

11. The processor of claim 9, wherein the operations further comprise:
    determining a value by dividing a highest candidate SSB index for a set of target SSBs by a value corresponding to the first indication,
    wherein, when the value is greater than or equal to 1, the monitoring scheme comprises monitoring two successive SSB occasions for the set of target SSBs, and
    wherein, when the value is less than 1, the monitoring scheme comprises monitoring one SSB occasion for the set of target SSBs.

12. The processor of claim 9, wherein the operations further comprise:
  determining a percentage value based on a number of sets of target SSBs having less than two corresponding SSB occasions compared to a total number of sets of target SSBs; and
  comparing the percentage value to a threshold percentage.

13. The processor of claim 12, wherein, when the percentage value is greater than the threshold percentage, the monitoring scheme comprises skipping the monitoring of the one or more sets of target SSBs, and
  wherein, when the percentage value is less than the threshold percentage, the monitoring scheme comprises monitoring two successive SSB occasions for a first set of target SSBs having two or more corresponding SSB occasions and monitoring one SSB occasion for a second set of target SSBs having less than two corresponding SSB occasions.

14. A base station, comprising:
  a transceiver configured to communicate with a user equipment (UE); and
  a processor communicatively coupled to the transceiver and configured to perform operations comprising:
    configuring one of a synchronization signal block (SSB) burst or a SSB based radio resource management (RRM) measurement timing configuration (SMTC) window comprising a first indication of a quasi-co-location (QCL) relationship between synchronization signal block (SSB) positions and a second indication of a location of one or more sets of target SSBs, wherein SSBs in each of the one or more sets of target SSBs are quasi-co-located; and
    generating, for transmission, to the UE, the one of the SSB burst or the SMTC window, wherein the UE determines a monitoring scheme comprising monitoring two successive SSB occasions for a first set of target SSBs having two or more corresponding SSB occasions and monitoring one SSB occasion for a second set of target SSBs having less than two corresponding SSB occasions.

15. The base station of claim 14, wherein the base station configures the one of the SSB burst or the SMTC window to comprise at least two corresponding SSB occasions for each of the one or more sets of target SSBs.

16. The base station of claim 14, wherein the base station configures the one of the SSB burst or the SMTC window to comprise each set of target SSBs having a value calculated by dividing a highest candidate SSB index for a set of target SSBs by a value corresponding to the first indication that is greater than or equal to 1.

17. The base station of claim 14, wherein the base station configures the one of the SSB burst or the SMTC window to comprise a percentage value based on a number of sets of target SSBs having less than two corresponding SSB occasions compared to a total number of sets of target SSBs that is less than a threshold percentage.

18. The base station of claim 14, wherein the bast station transmits the one of the SSB burst or the SMTC window in a new radio unlicensed (NR-U) band.

* * * * *